(12) United States Patent
Nag et al.

(10) Patent No.: US 11,900,161 B2
(45) Date of Patent: Feb. 13, 2024

(54) MEMORY ALLOCATION FOR PROCESSING-IN-MEMORY OPERATIONS

(71) Applicant: ADVANCED MICRO DEVICES, INC., Santa Clara, CA (US)

(72) Inventors: Anirban Nag, Milpitas, CA (US); Nuwan Jayasena, Santa Clara, CA (US); Shaizeen Aga, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 487 days.

(21) Appl. No.: 16/828,190

(22) Filed: Mar. 24, 2020

(65) Prior Publication Data

US 2021/0303355 A1 Sep. 30, 2021

(51) Int. Cl.
*G06F 9/50* (2006.01)
*G06F 12/1027* (2016.01)
*G06F 12/02* (2006.01)
*G06F 9/54* (2006.01)
*G06F 12/0882* (2016.01)

(52) U.S. Cl.
CPC ............ *G06F 9/5016* (2013.01); *G06F 9/546* (2013.01); *G06F 12/0246* (2013.01); *G06F 12/0882* (2013.01); *G06F 12/1027* (2013.01); *G06F 2212/657* (2013.01)

(58) Field of Classification Search
CPC .... G06F 9/5016; G06F 9/546; G06F 12/0246; G06F 12/0882; G06F 12/1027; G06F 2212/657; G06F 8/447; G06F 12/0215; G06F 12/0284; G06F 15/7821; G06F 12/0607; G06F 2212/1024; G06F 2212/7201

See application file for complete search history.

(56) References Cited

U.S. PATENT DOCUMENTS

| | | | | |
|---|---|---|---|---|
| 7,620,793 B1* | 11/2009 | Edmondson | ........ | G06F 12/0607 711/208 |
| 2004/0133765 A1* | 7/2004 | Tanaka | ................ | G06F 9/30181 712/E9.035 |
| 2014/0136754 A1* | 5/2014 | Hyde | .................. | G06F 11/3037 711/103 |
| 2016/0147667 A1* | 5/2016 | Awasthi | .............. | G06F 12/1491 711/163 |
| 2018/0284994 A1* | 10/2018 | Haller | ................. | G06F 12/0292 |
| 2020/0057717 A1* | 2/2020 | Jayasena | .............. | G06F 12/0246 |
| 2020/0073594 A1* | 3/2020 | Trout | .................... | G06F 3/0659 |
| 2020/0110705 A1* | 4/2020 | Jo | ........................ | G06F 9/30101 |
| 2021/0072986 A1* | 3/2021 | Yudanov | ............... | G06F 7/5443 |
| 2021/0294608 A1* | 9/2021 | Yudanov | .............. | G06N 3/0454 |

* cited by examiner

*Primary Examiner* — Tasnima Matin

(57) ABSTRACT

Memory allocation for processing-in-memory operations, including: receiving, by an allocation module, a memory allocation request indicating a plurality of data structure operands for a processing-in-memory operation; determining a memory allocation pattern for the plurality of data structure operands, wherein the memory allocation pattern interleaves a plurality of component pages of a memory page across the plurality of data structure operands; and allocating the memory page based on the determined memory allocation pattern.

20 Claims, 9 Drawing Sheets

FIG. 2

MEMORY ALLOCATION FOR PROCESSING-IN-MEMORY OPERATIONS

BACKGROUND

Processing-in-memory (PIM) allows for certain operations to be performed at the memory module, allowing for improved computational efficiency through reduced data transfer. However, processing-in-memory operations may have significant overhead in opening and closing rows in a memory bank storing the operands of the operation.

BRIEF DESCRIPTION OF THE DRAWINGS

FIG. 2 is a diagram of example allocation patterns for memory allocation for processing-in-memory operations according to some embodiments.

DETAILED DESCRIPTION

Figure 1:
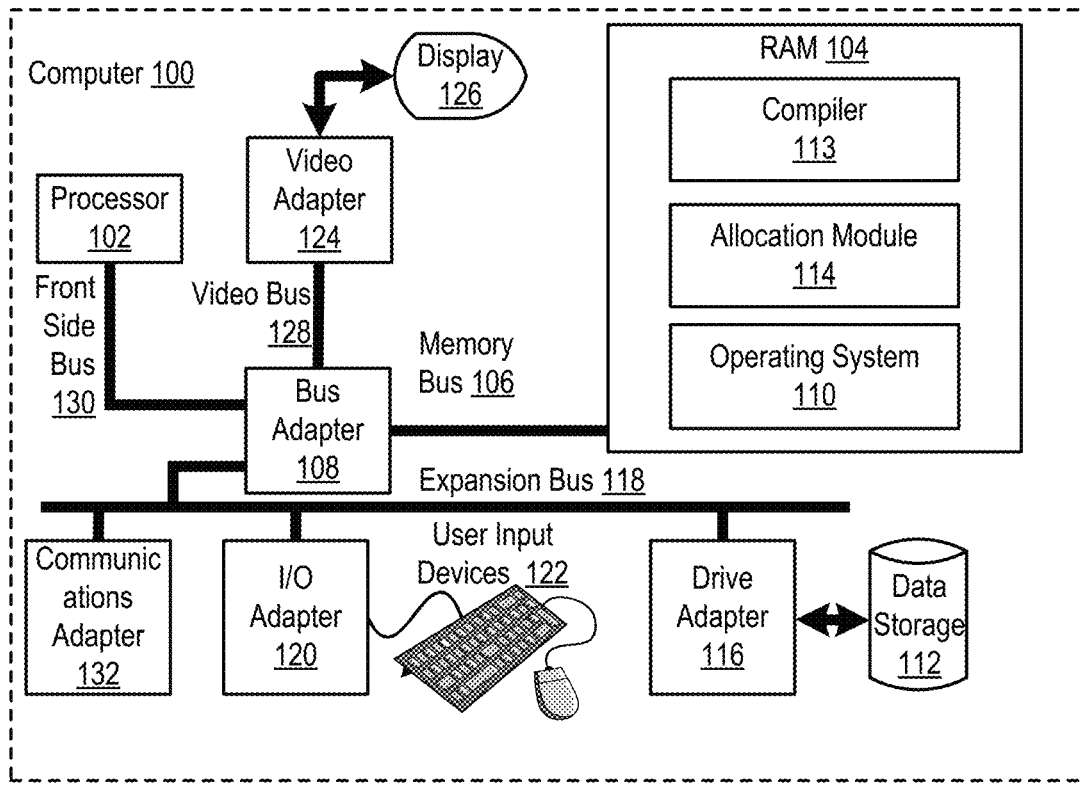
FIG. 1 is a block diagram of an example processor for memory allocation for processing-in-memory operations according to some embodiments.

In some embodiments, a method of memory allocation for processing-in-memory operations includes receiving, by an allocation module, a memory allocation request indicating a plurality of data structure operands for a processing-in-memory operation; determining a memory allocation pattern for the plurality of data structure operands, wherein the memory allocation pattern interleaves a plurality of component pages of a memory page across the plurality of data structure operands; and allocating the memory page based on the determined memory allocation pattern.

In some embodiments, allocating the memory page includes allocating component pages corresponding to different data structure operands within a same row of a memory array. In some embodiments, allocating the memory page includes allocating component pages for each data structure operand to different banks of a memory module. In some embodiments, the method further includes: identifying, by a compiler, for the plurality of data structure operands, an identifier corresponding to the processing-in-memory operation; and generating, by the compiler, an executable code command that, when executed, causes generation of the memory allocation request. In some embodiments, the method further includes determining, by the compiler, the memory allocation pattern; and wherein the executable code command indicates the memory allocation pattern. In some embodiments, the identifier is included in a plurality of identifiers each corresponding to a respective processing-in-memory operation, and the method further includes: determining, by the compiler, based on the plurality of identifiers, a plurality of data structure operand groupings; and wherein generating the executable code command includes generating, for each data structure operand grouping of the plurality of data structure operand groupings, a corresponding executable code command. In some embodiments, the method further includes storing, in a processing-in-memory translation lookaside buffer, one or more entries each facilitating translation between an application-level virtual address to a virtual address of a component page.

In some embodiments, an apparatus for memory allocation for processing-in-memory operations performs steps including: receiving, by an allocation module, a memory allocation request indicating a plurality of data structure operands for a processing-in-memory operation; determining a memory allocation pattern for the plurality of data structure operands, wherein the memory allocation pattern interleaves a plurality of component pages of a memory page across the plurality of data structure operands; and allocating the memory page based on the determined memory allocation pattern.

In some embodiments, allocating the memory page includes allocating component pages corresponding to different data structure operands within a same row of a memory array. In some embodiments, allocating the memory page includes allocating component pages for each data structure operand to different banks of a memory module. In some embodiments, the steps further include: identifying, by a compiler, for the plurality of data structure operands, an identifier corresponding to the processing-in-memory operation; and generating, by the compiler, an executable code command that, when executed, causes generation of the memory allocation request. In some embodiments, the steps further include determining, by the compiler, the memory allocation pattern; and wherein the executable code command indicates the memory allocation pattern. In some embodiments, the identifier is included in a plurality of identifiers each corresponding to a respective processing-in-memory operation, and the steps further include: determining, by the compiler, based on the plurality of identifiers, a plurality of data structure operand groupings; and wherein generating the executable code command includes generating, for each data structure operand grouping of the plurality of data structure operand groupings, a corresponding executable code command. In some embodiments, the steps further include storing, in a processing-in-memory translation lookaside buffer, one or more entries each facilitating translation between an application-level virtual address to a virtual address of a component page.

In some embodiments, computer program product disposed upon a non-transitory computer readable medium storing computer program instructions for memory allocation for processing-in-memory operations that, when executed, cause a computer system to perform steps including: receiving, by an allocation module, a memory allocation request indicating a plurality of data structure operands for a processing-in-memory operation; determining a memory allocation pattern for the plurality of data structure operands, wherein the memory allocation pattern interleaves a plurality of component pages of a memory page across the plurality of data structure operands; and allocating the memory page based on the determined memory allocation pattern.

In some embodiments, allocating the memory page includes allocating component pages corresponding to different data structure operands within a same row of a memory array. In some embodiments, allocating the memory page includes allocating component pages for each data structure operand to different banks of a memory module. In some embodiments, the steps further include: identifying, by a compiler, for the plurality of data structure operands, an identifier corresponding to the processing-in-memory operation; and generating, by the compiler, an executable code command that, when executed, causes generation of the memory allocation request. In some embodiments, the steps further include determining, by the compiler, the memory allocation pattern; and wherein the executable code command indicates the memory allocation pattern. In some embodiments, the identifier is included in a plurality of identifiers each corresponding to a respective processing-in-memory operation, and the steps further include: determining, by the compiler, based on the plurality of identifiers, a plurality of data structure operand groupings; and wherein generating the executable code command includes generating, for each data structure operand grouping of the plurality of data structure operand groupings, a corresponding executable code command. In some embodiments, the steps further include storing, in a processing-in-memory translation lookaside buffer, one or more entries each facilitating translation between an application-level virtual address to a virtual address of a component page.

Memory allocation for processing-in-memory operations in accordance with the present application is generally implemented with computers, that is, with automated computing machinery. For further explanation, therefore, FIG. 1 sets forth a block diagram of automated computing machinery including an exemplary computer 100 configured for memory allocation for processing-in-memory operations according to certain embodiments. The computer 100 of FIG. 1 includes at least one computer processor 102 or 'CPU' as well as random access memory 104 ('RAM') which is connected through a high speed memory bus 106 and bus adapter 108 to processor 102 and to other components of the computer 100.

Stored in RAM 104 is an operating system 110. Operating systems useful in computers configured for memory allocation for processing-in-memory operations according to certain embodiments include UNIX™, Linux™, Microsoft Windows™, and others as will occur to those of skill in the art. The operating system 110 in the example of FIG. 1 is shown in RAM 104, but many components of such software typically are stored in non-volatile memory also, such as, for example, on data storage 112, such as a disk drive. Also stored in RAM is a compiler 113 and the allocation module 114, a module for memory allocation for processing-in-memory operations according to certain embodiments.

The computer 100 of FIG. 1 includes disk drive adapter 116 coupled through expansion bus 118 and bus adapter 108 to processor 102 and other components of the computer 100. Disk drive adapter 116 connects non-volatile data storage to the computer 100 in the form of data storage 112. Disk drive adapters useful in computers configured for memory allocation for processing-in-memory operations according to certain embodiments include Integrated Drive Electronics ('IDE') adapters, Small Computer System Interface ('SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 100 of FIG. 1 includes one or more input/output ('I/O') adapters 120. I/O adapters implement user-oriented input/output through, for example, software drivers and computer hardware for controlling output to display devices such as computer display screens, as well as user input from user input devices 122 such as keyboards and mice. The example computer 100 of FIG. 1 includes a video adapter 124, which is an example of an I/O adapter specially designed for graphic output to a display device 126 such as a display screen or computer monitor. Video adapter 124 is connected to processor 102 through a high speed video bus 128, bus adapter 108, and the front side bus 130, which is also a high speed bus.

The exemplary computer 100 of FIG. 1 includes a communications adapter 132 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for memory allocation for processing-in-memory operations according to certain embodiments include modems for wired dial-up communications, Ethernet (IEEE 802.3) adapters for wired data communications, and 802.11 adapters for wireless data communications.

Figure 2:
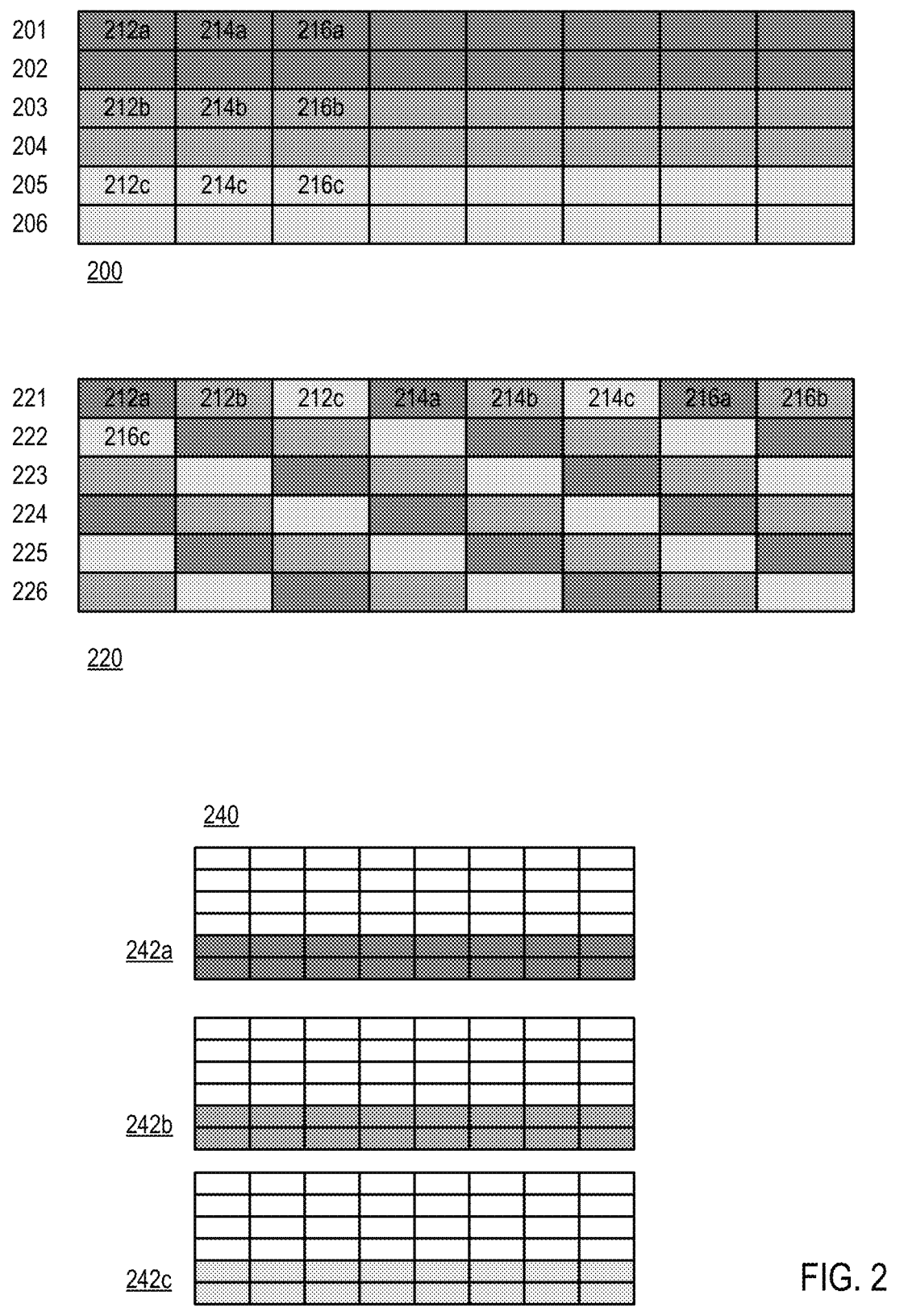

FIG. 2 shows a comparison of memory allocation schemes for processing-in-memory operations according to some embodiments. Memory systems comprise of a hierarchy of levels of groupings of memory cells, such as modules, channels, banks, and sub-arrays. Processing in memory implements logic associated with any one or more of the levels of such a hierarchy so as to minimize data movement. A processing-in-memory operation is performed in a memory module so as to minimize data movement. Example processing-in-memory implementations include: (i) logic placed in every memory channel (e.g., on a logic die in 3D stacked High Bandwidth Memory (HBM)), (ii) logic placed near the row-buffer of every bank. The PIM logic commonly consists of the following: (i) arithmetic and bitwise logic units, (ii) a register file to store operands and temporary values, and (iii) a control logic which moves data around between row-buffer, register file and computation units based on PIM commands received from the memory controller (MC). Application of the principles of the invention to other groupings in a memory system will be apparent to those skilled in the art.

In the context of FIG. 2, assume a processing-in-memory operation "$c[i]=a[i]+b[i]$" such at each entry in an array c[ ] is the sum of corresponding entries in arrays a[ ] and b[ ]. Bank 200 is a Dynamic Random Access Memory bank showing a conventional memory allocation scheme within for such an operation. Each box in the bank 200 represents an interleave granularity (e.g., 256-byte chunk of data) at which the physical address space of the system is distributed across multiple banks and channels of a multi-bank, multi-channel memory system. Each box and its corresponding peers across multiple channels or banks correspond to a component page of a larger memory page. For example, a large page is allocated in memory by allocating a plurality of component pages. Here, array a[ ] is mapped to rows 201 and 202 of bank 200, array b[ ] is mapped to rows 203 and 204 of bank 200, and array c[ ] is mapped to rows 205 and 206 of bank 200. Each entry in the arrays a[ ], b[ ], and c[ ] are stored in contiguous physical memory regions within the bank 200. In other words, the entries for array a[ ] are contiguous with each other, the entries for array b[ ] are contiguous with each other, and the entries for array c[ ] are contiguous with each other.

To store the sum of entries arrays a[ ] and b[ ] into array c[ ], the following steps are required: 1) A row for array a[ ] is opened (e.g., row 201). 2) a chunk (e.g., chunk 212a) is read and stored in temporary storage. 3) A row for array b[ ] is opened (e.g., row 203). 5) A chunk (e.g., chunk 212b) is read and added to the value (e.g., of chunk 212a) in temporary storage. 5) A row for array c[ ] is opened (e.g., row 205). 6) The value in temporary storage is stored in page 212c. The process is then repeated (e.g., to add chunk 214a and 214b for storage as chunk 214c, to add page 216a and 216b for storage as chunk 216c, etc. Using this existing mapping approach with this example, each addition operation performed across the arrays requires three row open/close operations, one for each operand of the operation. As each open/close operation comes with additional overhead, the overall array addition operation includes significant overhead.

In contrast to bank 200, bank 220 illustrates one example memory mapping for memory allocation for processing-in-memory operations according to some embodiments. In the example mapping for bank 220, one or more pages of memory are allocated for arrays a[ ], b[ ], and c[ ] (e.g., a single page for all arrays, pages each for a corresponding arrays, etc.). In this example, an allocated page includes a number of component pages each corresponding to a box in the bank 220. In the example bank 220, the component pages are interleaved across the operands of the processing-in-memory operation (e.g., the arrays a[ ], b[ ], and c[ ]). In the example bank 220, the component pages are interleaved within rows 221, 222, 223, 224, 225, 226. Using this mapping, the array addition operation can be performed with reduced row open/close operations. For example, by opening row 221, chunks 212a and 212b can be added for storage in chunk 212c, chunks 214a and 214b can be added and stored in chunk 214c, and chunks 216a and 216b can be added and stored in temporary storage. An additional row open operation for row 222 would be required to store this added value in chunk 216c. Using this approach, processing efficiency is increased by reducing the overhead caused by row open/close operations. This example memory mapping for memory allocation for processing-in-memory operations is implemented, for example, where processing-in-memory logic is installed or implemented at the bank level, such that the memory pages for different operands are interleaved within the same rows of the same bank 220.

In further contrast to bank 200, memory channel 240 illustrates one example memory mapping for memory allocation for processing-in-memory operations according to some embodiments. The example memory mapping shown for memory channel 240 is implemented, for example, where processing-in-memory logic is installed or implemented at the channel level, allowing for processing-in-memory operations to be performed across multiple banks in the same channel. Memory channel 240 includes banks 242a, 242b, and 242c. Component pages for array a[ ] are stored in bank 242a, component pages for array b[ ] are stored in bank 242b, and component pages for array c[ ] are stored in bank 242c. Using this example, each bank 242a,b,c can have a row open simultaneously, further reducing of overhead caused by row open operations by interleaving the component pages across different banks.

Figure 3:
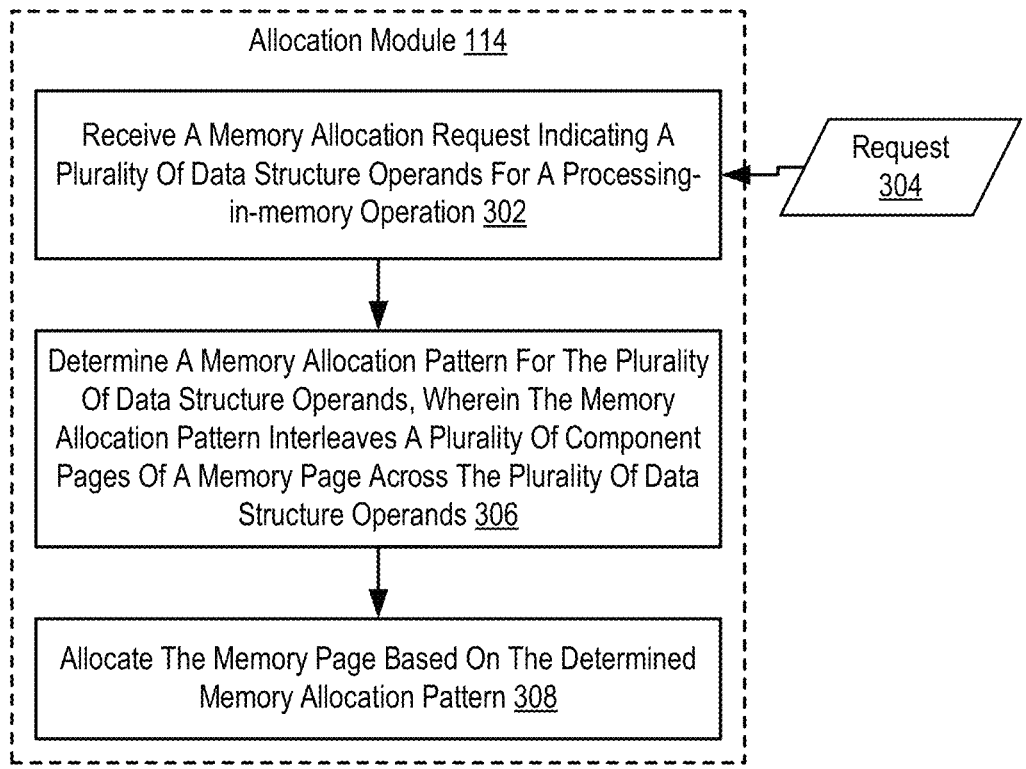
FIG. 3 is a flowchart of an example method for memory allocation for processing-in-memory operations according to some embodiments.

For further explanation, FIG. 3 sets forth a flow chart illustrating an exemplary method for memory allocation for processing-in-memory operations that includes receiving 302 (e.g., by an allocation module) a memory allocation request 304 indicating a plurality of data structure operands for a processing-in-memory operation. In an embodiment, the allocation module 114 is implemented at a kernel level and receives 302 the request 304 in response to an execution of one or more commands or operations to perform the processing-in-memory operation. In an embodiment, the request 304 corresponds to or is generated in response to a memory allocation command (e.g., "malloc" operation). The request 304 indicates one or more parameters associated with the processing-in-memory operation. For example, the one or more parameters include an indication as to a level of memory granularity at which processing-in-memory logic is implemented (e.g., at each bank, at the channel level, etc.).

In some embodiments, the one or more parameters indicate a number of operands (e.g., data structures) associated with one or more processing-in-memory operations. An operand for a processing-in-memory operation is a data structure used as an argument in the operation. In other words, the operand is a data structure from which data is loaded or to which data is stored during the operation. For example, the request 304 is associated with a single processing-in-memory operation. The request 304 then indicates the number of operands for the single processing-in-memory operation. As another example, 304 the request is associated with multiple processing-in-memory operations with one or more overlapping operands (e.g., an operand for one operation is also an operand for another operation). The request 304 then indicates the number of unique operands across all associated operations. In some embodiments, the one or more parameters indicate a size of each operand.

In some embodiments, the one or more parameters indicate an interleaving pattern for each operand. The interleaving pattern defines how component pages (e.g., physical pages storing a value) of the operands are interleaved across banks, rows, etc. For example, the interleaving pattern indicates that component pages for different operands are to be interleaved across the same rows within a bank (e.g., as seen in a bank 220 of FIG. 2). As another example, the interleaving pattern indicates that component pages for different operands are to be interleaved across different banks within the same channel (e.g., as seen in channel 240 of FIG. 2). In some embodiments, the interleaving pattern is determined at compile time and included in a command or instruction that caused generation of the request 304. In other embodiments, the interleaving pattern is determined at runtime and included in the request 304, or determined by the allocation module 114.

The method of FIG. 3 also includes determining 306 a memory allocation pattern for the plurality of data structure operands, wherein the memory allocation pattern interleaves a plurality of component page of a memory page across the plurality of data structure operands. The memory allocation pattern includes allocation of a memory page including a plurality of component pages. The memory allocation pattern also includes a mapping of virtual memory to physical memory. For example, the memory page is allocated as a large memory page (e.g., using Binary Buddy Allocator) in virtual memory such that each component page corresponds to a contiguous virtual address. The interleaving pattern determines to what degree the component pages are contiguous in physical memory. Continuing with the example processing-in-memory operation of c[i]=a[i]+b[i], the virtual addresses for each array is allocated in contiguous virtual memory (e.g., each component page of a same array are virtually contiguous, and/or the component pages of all arrays are contiguous with each other). Using the interleaving pattern of bank 220 of FIG. 2, the component pages for each array are non-contiguous in physical address space. Using the interleaving pattern of channel 240, the component pages within the same array are contiguous in physical address space, but each array is stored non-contiguous to other arrays across different banks.

The method of FIG. 3 also includes allocating 308 the memory page based on the determined memory allocation pattern. Allocating 308 the memory page includes allocating a virtual memory page including a plurality of component virtual memory pages. Allocating 308 the memory page also includes allocating a plurality of component pages in physical memory according to the interleaving pattern of the memory allocation pattern. In some embodiments, an additional data structure is maintained to facilitate access of interleaved component pages in physical memory using contiguous virtual memory addresses. For example, an additional translation lookaside buffer, hereinafter referred to as a processing-in-memory translation lookaside buffer (pTLB) maintains entries mapping offsets between virtual memory addresses and physical addresses, as is described in more detail below.

Figure 4:
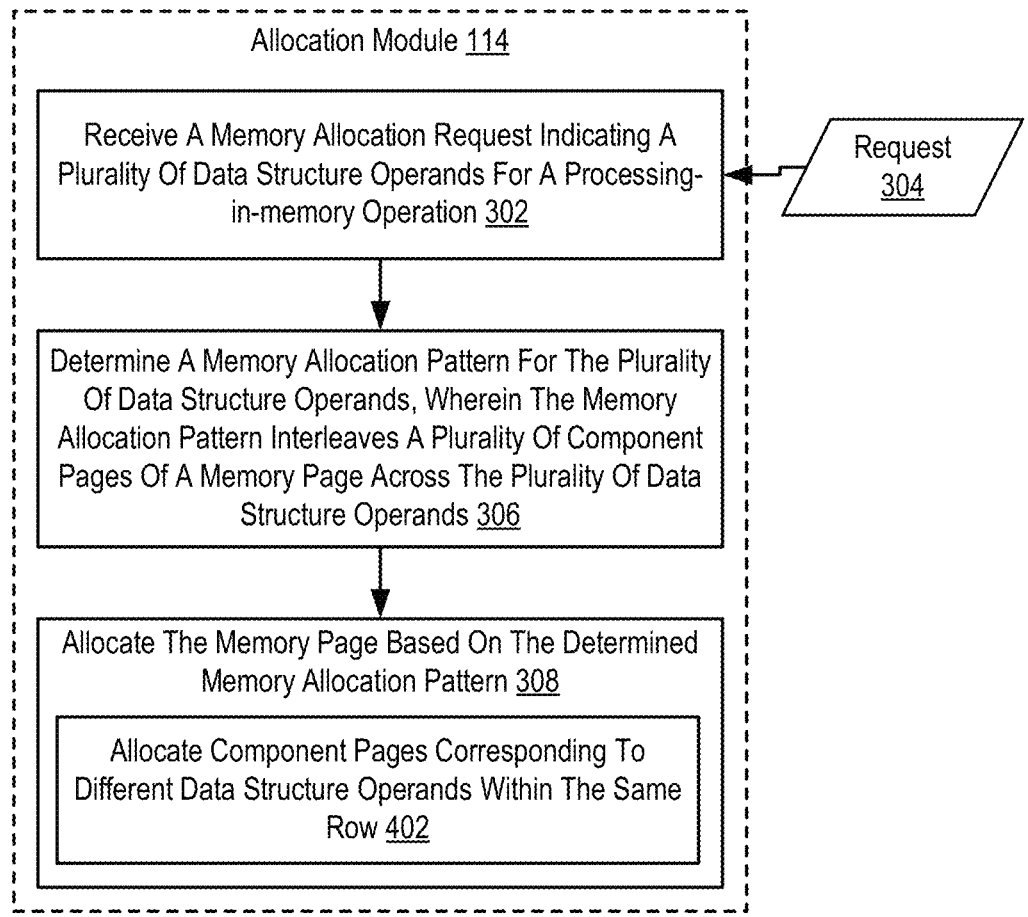
FIG. 4 is a flowchart of an example method for memory allocation for processing-in-memory operations according to some embodiments.

For further explanation, FIG. 4 sets forth a flow chart illustrating an exemplary method for memory allocation for processing-in-memory operations that includes receiving 302 (e.g., by an allocation module) a memory allocation request 304 indicating a plurality of data structure operands for a processing-in-memory operation; determining 306 a memory allocation pattern for the plurality of data structure operands, wherein the memory allocation pattern interleaves a plurality of component page of a memory page across the plurality of data structure operands; and allocating 308 the memory page based on the determined memory allocation pattern.

The method of FIG. 4 differs from FIG. 3 in that allocating 308 the memory page based on the determined memory allocation pattern includes allocating 402 component pages corresponding to different data structure operands within the same row. For example, the component pages corresponding to different data structure operands are allocated within the same row of a memory bank based on an indication in the request 304, in response to processing-in-memory logic being implemented on a per-bank level of granularity, or in response to other criteria. In some embodiments, the component pages are allocated according to a rotating or cyclical distribution across the data structure operands. For example, a first component page is allocated for each operand, a second component page is allocated for each operand, etc. One skilled in the art would appreciate that other distribution patterns facilitate distribution of component pages of different data structure operands across the same row of a memory bank.

Figure 5:
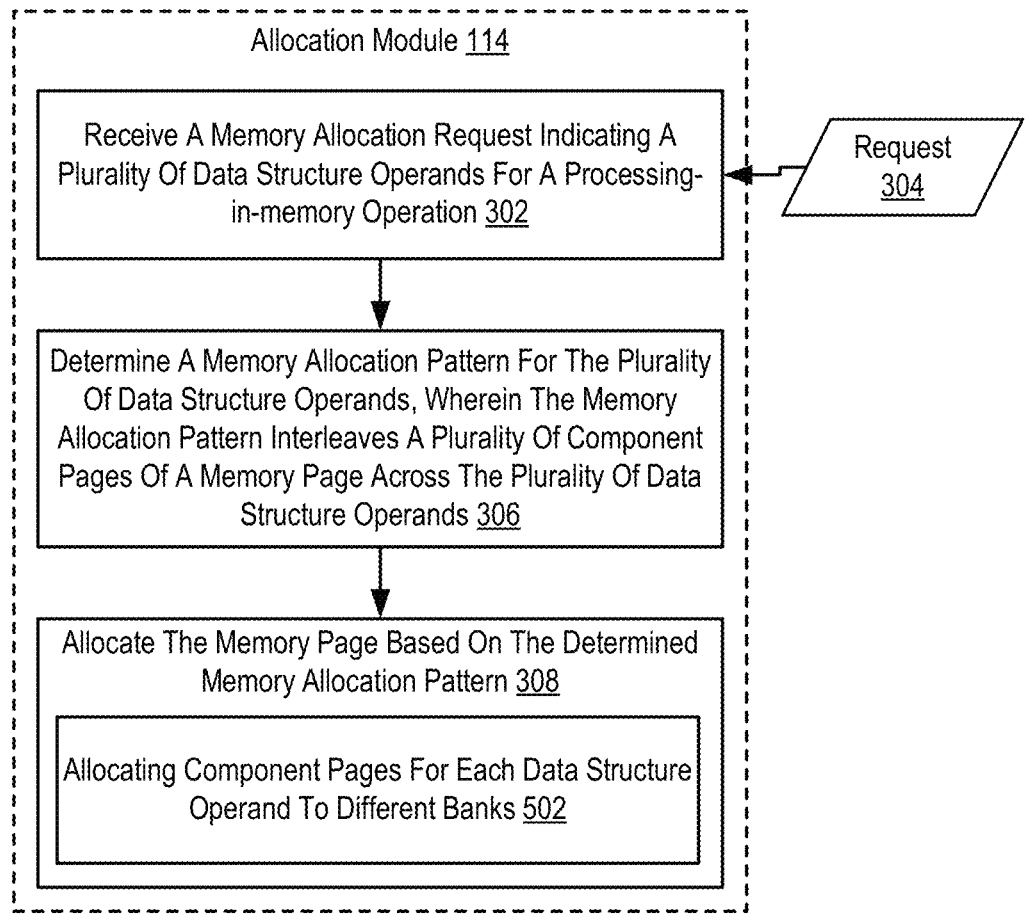
FIG. 5 is a flowchart of an example method for memory allocation for processing-in-memory operations according to some embodiments.

For further explanation, FIG. 5 sets forth a flow chart illustrating an exemplary method for memory allocation for processing-in-memory operations that includes receiving 302 (e.g., by an allocation module) a memory allocation request 304 indicating a plurality of data structure operands for a processing-in-memory operation; determining 306 a memory allocation pattern for the plurality of data structure operands, wherein the memory allocation pattern interleaves a plurality of component page of a memory page across the plurality of data structure operands; and allocating 308 the memory page based on the determined memory allocation pattern.

The method of FIG. 5 differs from FIG. 3 in that allocating 308 the memory page based on the determined memory allocation pattern includes allocating 502 component pages for each data structure operand to different banks of a memory module. For example, the component pages corresponding to different data structure operands are allocated to different banks of a memory module within a same channel, based on an indication in the request 304, in response to processing-in-memory logic being implemented on a per-channel level of granularity, or in response to other criteria. Where a number of operand data structures exceeds a number of banks available within the same channel, the component pages of one of more data structures occupies a same bank. In such an embodiment, the component pages of the data structures occupying the same bank are further interleaved (e.g., across the same row or according to another pattern) or allocated to different rows within the same bank.

Figure 6:
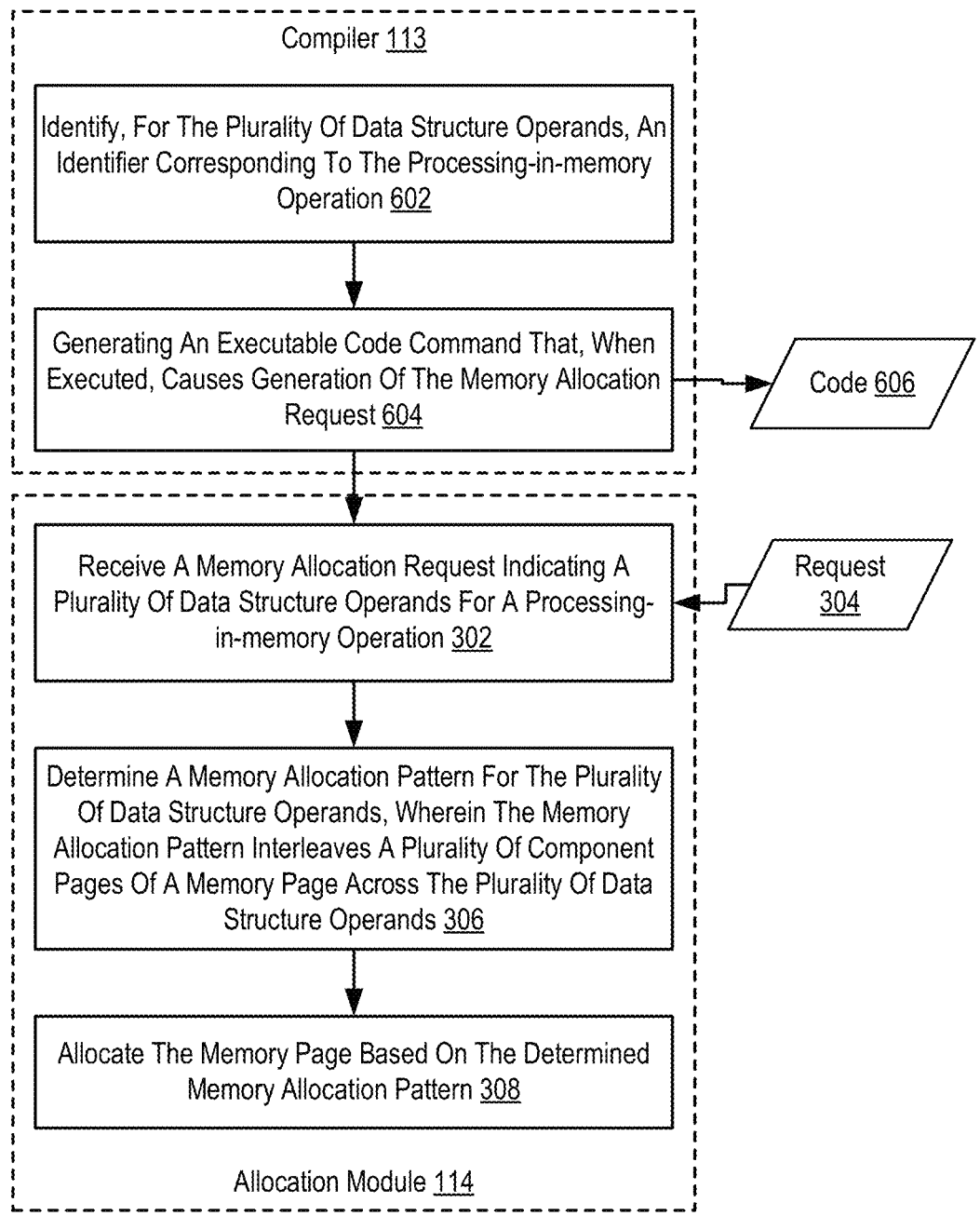
FIG. 6 is a flowchart of an example method for memory allocation for processing-in-memory operations according to some embodiments.

For further explanation, FIG. 6 sets forth a flow chart illustrating an exemplary method for memory allocation for processing-in-memory operations that includes receiving 302 (e.g., by an allocation module) a memory allocation request 304 indicating a plurality of data structure operands for a processing-in-memory operation; determining 306 a memory allocation pattern for the plurality of data structure operands, wherein the memory allocation pattern interleaves a plurality of component page of a memory page across the plurality of data structure operands; and allocating 308 the memory page based on the determined memory allocation pattern.

The method of FIG. 6 differs from FIG. 3 in that the method of FIG. 6 also includes identifying 602 (e.g., by a compiler 113), for the plurality of data structure operands, an identifier corresponding to the processing-in-memory operation. For example, programming language code for an operation or method includes a flag, identifier, parameter, or other indication that the operation or method should be performed using processing-in-memory logic. The compiler 113 then identifies this flag or parameter to determine that the corresponding data structure operands are associated with a processing-in-memory operation. Where a particular file, method, program, or other collection of programming code includes multiple processing-in-memory operations, each operation corresponds to a particular unique identifier. Thus, the compiler 113 determines for which processing-in-memory operations a particular data structure operand is used.

The method of FIG. 6 also includes generating 604 (e.g., by the compiler 113) an executable code command (e.g., as part of processor-executable code 606) that, when executed, causes generation of the memory allocation request 304. The executable code command includes, for example a memory allocation or "malloc" command. In some embodiments, the executable code command encodes the one or more parameters of the request 604, including a number of data structure operands, a size of data structure operands, a memory allocation pattern for component memory pages, etc.

Although the preceding method describes functionality performed by a compiler 113, it is understood that such operations may also be performed by a runtime system.

Figure 7:
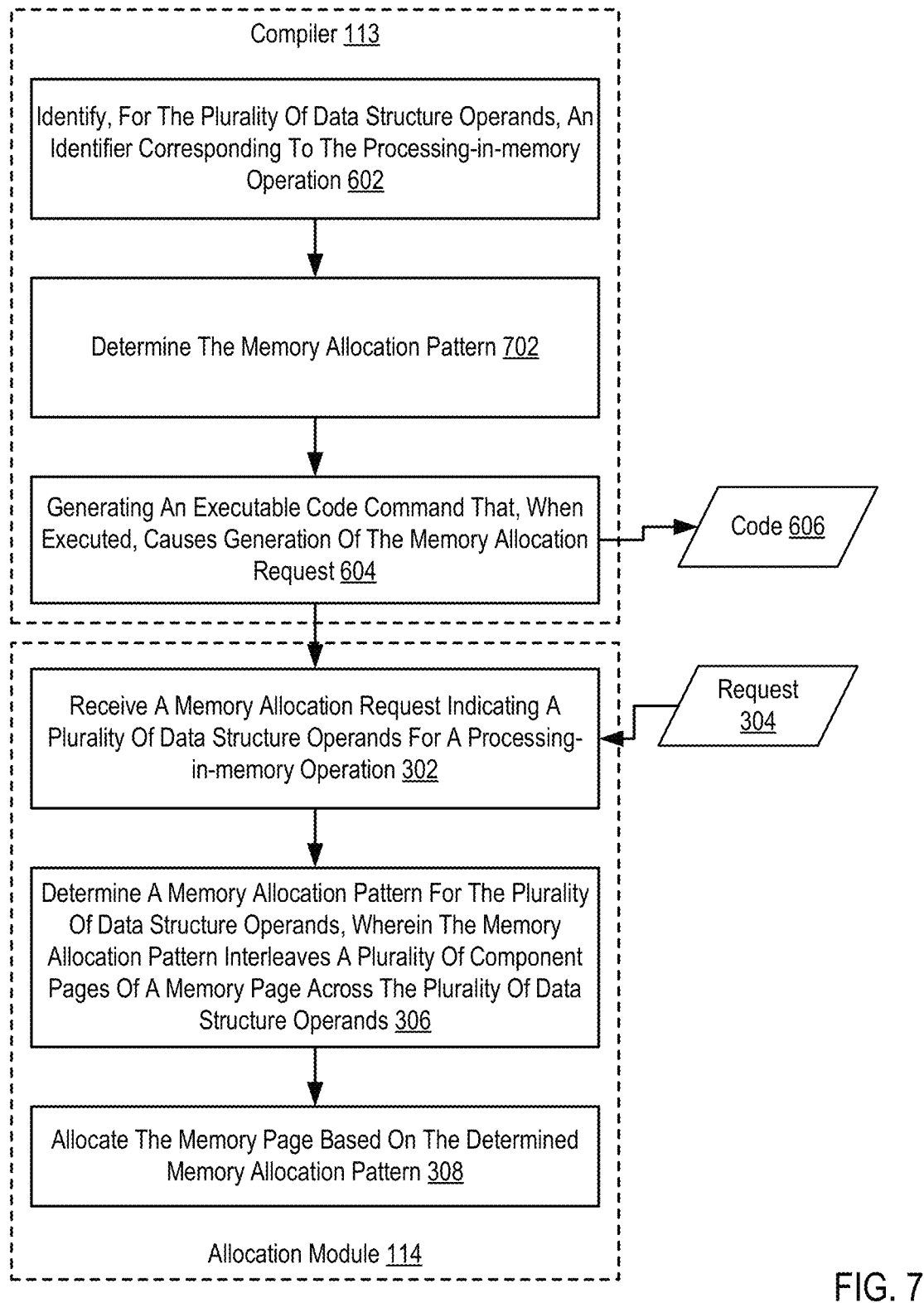
FIG. 7 is a flowchart of an example method for memory allocation for processing-in-memory operations according to some embodiments.

For further explanation, FIG. 7 sets forth a flow chart illustrating an exemplary method for memory allocation for processing-in-memory operations that includes identifying 602 (e.g., by a compiler 113), for the plurality of data structure operands, an identifier corresponding to the processing-in-memory operation; and generating 604 (e.g., by the compiler 113) an executable code command (e.g., as part of processor-executable code 606) that, when executed, causes generation of the memory allocation request 304; receiving 302 (e.g., by an allocation module) a memory allocation request 304 indicating a plurality of data structure operands for a processing-in-memory operation; determining 306 a memory allocation pattern for the plurality of data structure operands, wherein the memory allocation pattern interleaves a plurality of component page of a memory page across the plurality of data structure operands; and allocating 308 the memory page based on the determined memory allocation pattern.

The method of FIG. 7 differs from FIG. 6 in that the method of FIG. 7 also includes determining 702 (e.g., by the compiler 113) the memory allocation pattern. In some embodiments, the compiler 113 repeatedly performs the processing-in-memory operation using a plurality of different memory allocation patterns (e.g., different patterns for interleaving the component pages of data structure operands). The compiler 113 then determines a memory allocation pattern according to one or more benchmarks or metrics. Accordingly, the generated 604 executable code command encodes an indication of the determined 702 memory allocation pattern.

Figure 8:
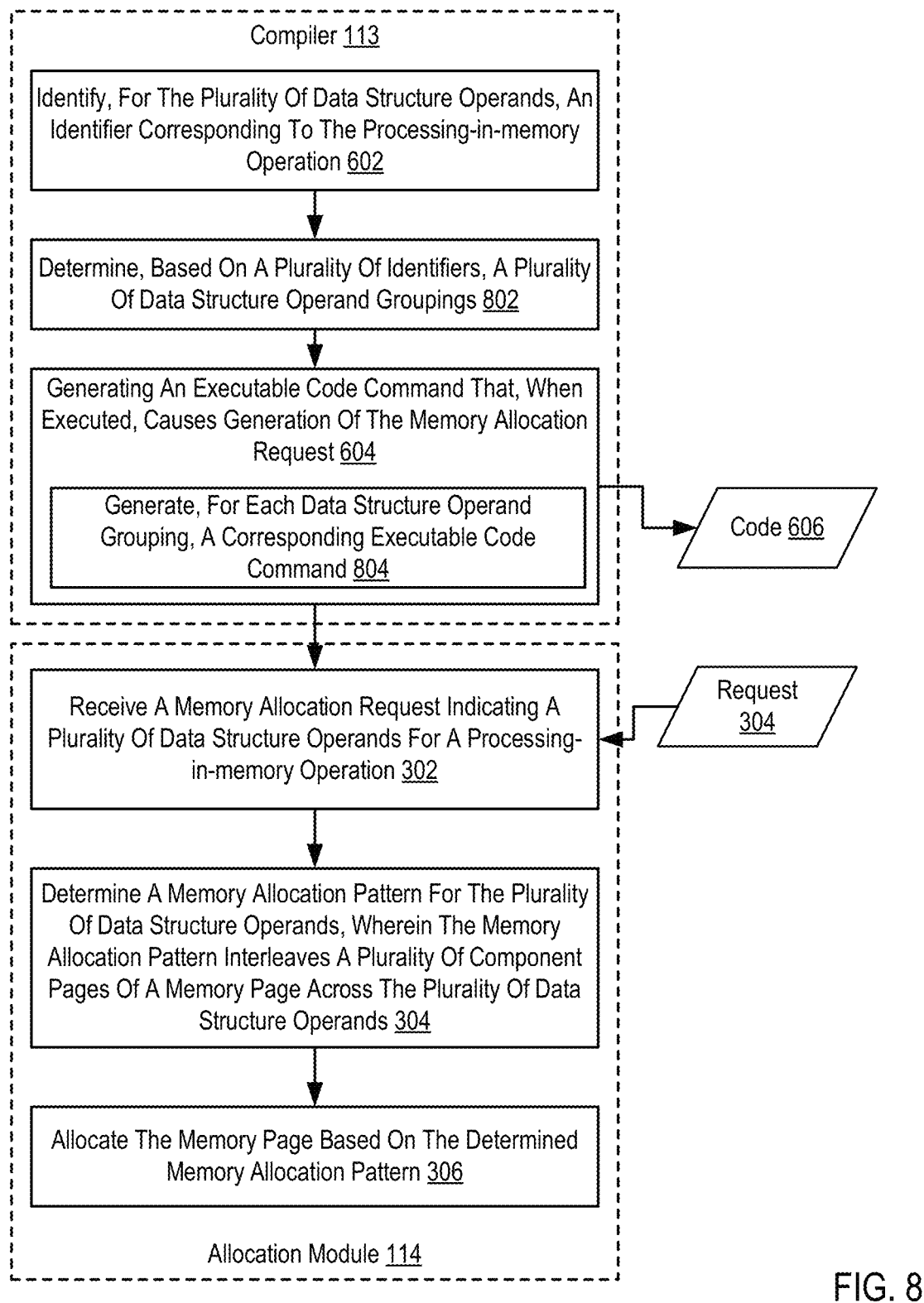
FIG. 8 is a flowchart of an example method for memory allocation for processing-in-memory operations according to some embodiments.

For further explanation, FIG. 8 sets forth a flow chart illustrating an exemplary method for memory allocation for processing-in-memory operations that includes identifying 602 (e.g., by a compiler 113), for the plurality of data structure operands, an identifier corresponding to the processing-in-memory operation; and generating 604 (e.g., by the compiler 113) an executable code command (e.g., as part of processor-executable code 606) that, when executed, causes generation of the memory allocation request 304; receiving 302 (e.g., by an allocation module) a memory allocation request 304 indicating a plurality of data structure operands for a processing-in-memory operation; determining 306 a memory allocation pattern for the plurality of data structure operands, wherein the memory allocation pattern interleaves a plurality of component page of a memory page across the plurality of data structure operands; and allocating 308 the memory page based on the determined memory allocation pattern.

The method of FIG. 8 differs from FIG. 6 in that the method of FIG. 8 also includes determining 802, based on a plurality of identifiers, a plurality of data structure operand groupings. For example, assume that the identified 602 identifier is included in a plurality of identifiers each corresponding to a respective processing-in-memory operation. Each processing-in-memory operation includes respective plurality of data structure operands. A data structure operand grouping includes each data structure operand those of one or more of the processing-in-memory operations linked by at least one data structure operand.

For example, the compiler 113 generates a graph for each processing-in-memory operation. Each node in the graph corresponds to a data structure operand. Where a node is shared between two graphs, those graphs are merged. For example, assume the following operations: z[i]=x[i]+y[i] ("Operation Z"), n[i]=x[i] *m[i] ("Operation N"), c[i]=a[i]+b[i] ("Operation C"). Operation Z overlaps with Operation N via the x[ ] node. Accordingly, the compiler 113 would generate a first graph for nodes x[ ], y[ ], z[ ], n[ ], and m[ ], and a second graph for nodes c[ ], a[ ], and b[ ]. In other words, the compiler 113 generates a first data structure operand grouping for data structure operands x[ ], y[ ], z[ ], n[ ], and m[ ], and a second data structure operand grouping for data structure operands c[ ], a[ ], and b[ ]. Particularly, the first data structure operand grouping corresponds to multiple processing-in-memory operations as it includes the data structure operands from multiple processing-in-memory operations.

The method of FIG. 8 further differs from FIG. 6 in that generating 604 an executable code command that, when executed, causes generation of the memory allocation request 304 includes generating 804 (e.g., by the compiler 113), for each data structure operand grouping, a corresponding executable code command. Each generated executable code command would include the parameters of the associated data structure operands of the data structure operand grouping. The generated executable code command, when executed, allocates memory for data structure operands used in one or multiple processing-in-memory operations.

Figure 9:
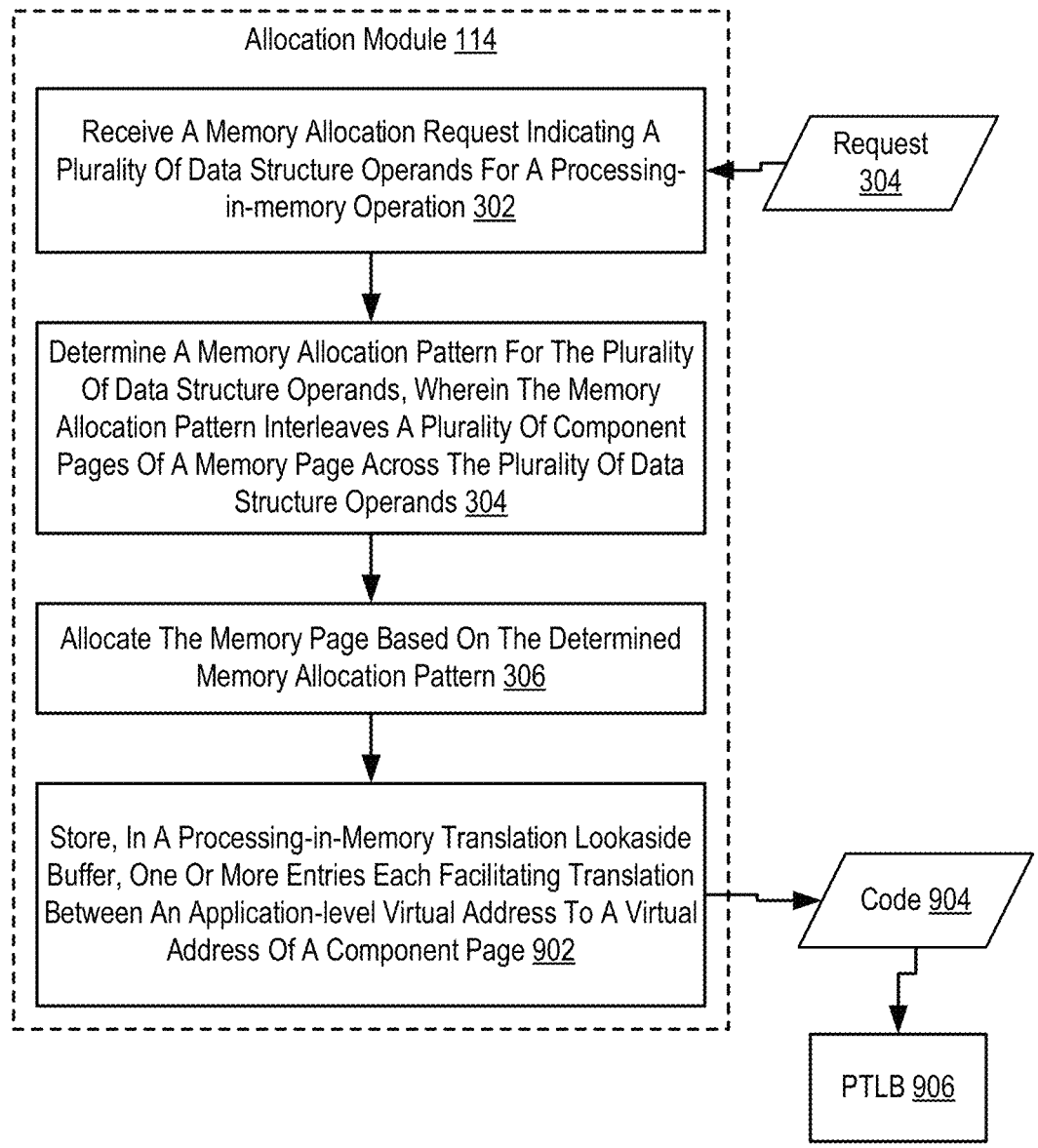
FIG. 9 is a flowchart of an example method for memory allocation for processing-in-memory operations according to some embodiments.

For further explanation, FIG. 9 sets forth a flow chart illustrating an exemplary method for memory allocation for processing-in-memory operations that includes receiving 302 (e.g., by an allocation module) a memory allocation request 304 indicating a plurality of data structure operands for a processing-in-memory operation; determining 306 a memory allocation pattern for the plurality of data structure operands, wherein the memory allocation pattern interleaves a plurality of component page of a memory page across the plurality of data structure operands; and allocating 308 the memory page based on the determined memory allocation pattern.

The method of FIG. 9 differs from FIG. 3 in that the method of FIG. 9 also includes storing 902, in a processing-in-memory translation lookaside buffer (PTLB 906), one or more entries each facilitating translation between the virtual address of an application-level operand and the virtual address(es) of the corresponding component page(s). In an embodiment, the processing-in-memory translation lookaside buffer 906 is a dedicated translation lookaside buffer (e.g. separate from other translation lookaside buffers) facilitating translations between virtual addresses and offsets of the component pages within the memory page for memory allocated for processing-in-memory operations. For example, Assume a virtual address (VA) with the following component bits: [VPN_B][VPN_S][Offset_S], where VPN_B is the virtual page number of the memory page (e.g., the "big" memory page composed of multiple "small" component pages), VPN_S is the virtual page number of the component page within the memory page, and Offset_S is an offset within the component page. The processing-in-memory translation lookaside buffer 906 would store an entry translating VPN_S to PPN_S, the page number of the component page within the (big) memory page (e.g., the offset relative to the start address of the allocated memory page). A new virtual address pVA is then determined as [VPN_B][PPN_S][Offset_S]. The new virtual address pVA is then translated using a translation lookaside buffer for translating virtual page numbers to physical page numbers and/or a page table to generate a physical address PA defined as [PPN_B][PPN_S][Offset_S], where PPN_B is a physical page number translated from a page table and/or translation lookaside buffer. In some embodiments, storing 902 the entry 904 is performed in response to a "miss" when referencing the processing-in-memory translation lookaside buffer 906. For example, where VPN_S has no corresponding entry indicating PPN_S, PPN_S can be calculated using a function dependent on the particular interleaving scheme and stored as the entry 904. One skilled in the art would appreciate that, in some embodiments, the translation between virtual addresses and component page offsets performed by the processing-in-memory translation lookaside buffer 906 can instead be performed using additional computation instructions generated at compile time for operations accessing the allocated memory.

In view of the explanations set forth above, readers will recognize that the benefits of memory allocation for processing-in-memory operations include:

Improved performance of a computing system by reduced overhead in processing-in-memory operations.

Improved performance of a computing system by determining optimal memory interleaving patterns for processing-in-memory operations.

Exemplary embodiments of the present disclosure are described largely in the context of a fully functional computer system for memory allocation for processing-in-memory operations. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of memory allocation for processing-in-memory operations, the method comprising:
  receiving a memory allocation request indicating a plurality of data structure operands for a processing-in-memory operation; and
  allocating a memory page based on a memory allocation pattern for the plurality of data structure operands, wherein the memory allocation pattern is determined by a compiler and indicated by a parameter in the received memory allocation request.

2. The method of claim 1, wherein allocating the memory page comprises allocating component pages corresponding to different data structure operands within a same row of a memory array.

3. The method of claim 1, wherein allocating the memory page comprises allocating component pages for each data structure operand to different banks of a memory module.

4. The method of claim 1, further comprising:
  identifying, by the compiler, for the plurality of data structure operands, an identifier corresponding to the processing-in-memory operation; and
  generating, by the compiler, an executable code command that, when executed, causes generation of the memory allocation request.

5. The method of claim 4, wherein the executable code command indicates the memory allocation pattern.

6. The method of claim 4, wherein the identifier is included in a plurality of identifiers each corresponding to a respective processing-in-memory operation, and the method further comprises:
  determining, by the compiler, based on the plurality of identifiers, a plurality of data structure operand groupings, wherein generating the executable code command comprises generating, for each data structure operand grouping of the plurality of data structure operand groupings, a corresponding executable code command.

7. The method of claim 1, further comprising storing, in a processing-in-memory translation lookaside buffer, one or more entries each facilitating translation between an application-level virtual address to a virtual address of a component page.

8. An apparatus for memory allocation for processing-in-memory operations, the apparatus comprising:
  a processor; and
  a memory coupled to the processor, wherein the memory comprises instructions executed by the processor to:
    receive a memory allocation request indicating a plurality of data structure operands for a processing-in-memory operation; and
    allocate a memory page based on a memory allocation pattern for the plurality of data structure operands, wherein the memory allocation pattern is determined by a compiler and indicated by a parameter in the received memory allocation request.

9. The apparatus of claim 8, wherein allocating the memory page comprises allocating component pages corresponding to different data structure operands within a same row of a memory array.

10. The apparatus of claim 8, wherein allocating component pages for each data structure operand to different banks of a memory module.

11. The apparatus of claim 8, wherein the processor is further configured to execute instructions to:
  identify, by the compiler, for the plurality of data structure operands, an identifier corresponding to the processing-in-memory operation; and
  generate, by the compiler, an executable code command that, when executed, causes generation of the memory allocation request.

12. The apparatus of claim 11, wherein the processor is further configured to execute instructions to:
  determine, by the compiler, the memory allocation pattern, wherein the executable code command indicates the memory allocation pattern.

13. The apparatus of claim 11, wherein the identifier is included in a plurality of identifiers each corresponding to a respective processing-in-memory operation, and the processor is further configured to execute instructions to determine, by the compiler, based on the plurality of identifiers, a plurality of data structure operand groupings, wherein generate the executable code command comprises generating, for each data structure operand grouping of the plurality of data structure operand groupings, a corresponding executable code command.

14. The apparatus of claim 8, wherein the processor is further configured to execute instructions to store in a processing-in-memory translation lookaside buffer, one or more entries each facilitating translation between an application-level virtual address to a virtual address of a component page.

15. A computer program product disposed upon a non-transitory computer readable medium, the computer program product comprising computer program instructions that, when executed, cause a processor to:
- receive a memory allocation request indicating a plurality of data structure operands for a processing-in-memory operation; and
- allocate a memory page based on a memory allocation pattern for the plurality of data structure operands, wherein the memory allocation pattern is determined by a compiler and indicated by a parameter in the received memory allocation request.

16. The computer program product of claim 15, wherein allocating the memory page further comprises allocating component pages corresponding to different data structure operands within a same row of a memory array.

17. The computer program product of claim 15, wherein allocating the memory page further comprises allocating pages for each data structure operand to different banks of a memory module.

18. The computer program product of claim 15, further comprising instructions that, when executed, cause the processor to:
- identify, by the compiler, for the plurality of data structure operands, an identifier corresponding to the processing-in-memory operation; and
- generate, by the compiler, an executable code command that, when executed, causes generation of the memory allocation request.

19. The computer program product of claim 18, further comprising instructions that, when executed, cause the processor to:
- determine, by the compiler, the memory allocation pattern, wherein the executable code command indicates the memory allocation pattern.

20. The computer program product of claim 18, wherein the identifier is included in a plurality of identifiers each corresponding to a respective processing-in-memory operation, and further comprising instructions that, when executed, cause the processor to:
- determine, by the compiler, based on the plurality of identifiers, a plurality of data structure operand groupings, wherein the instructions for processing-in-memory operations that, when executed, cause the processor to generate the executable code command comprises instructions for processing-in-memory operations that, when executed, cause the processor to generate, for each data structure operand grouping of the plurality of data structure operand groupings, a corresponding executable code command.

\* \* \* \* \*